United States Patent
Kong et al.

(10) Patent No.: US 8,786,936 B2
(45) Date of Patent: Jul. 22, 2014

(54) INK COMPOSITIONS, METHODS OF PREPARING INK COMPOSITIONS AND DISPLAY PANELS INCLUDING INK COMPOSITIONS

(71) Applicants: Jung-Il Kong, Siheung-si (KR); Jung-Sok Noh, Guri-si (KR); Hoon Cheong, Suwon-si (KR); Deok-Min Park, Anyang-si (KR); Hee-Jong Kim, Anyang-si (KR); Jin-Hwan Jung, Anyang-si (KR); Cheol-Woo Kim, Incheon (KR)

(72) Inventors: Jung-Il Kong, Siheung-si (KR); Jung-Sok Noh, Guri-si (KR); Hoon Cheong, Suwon-si (KR); Deok-Min Park, Anyang-si (KR); Hee-Jong Kim, Anyang-si (KR); Jin-Hwan Jung, Anyang-si (KR); Cheol-Woo Kim, Incheon (KR)

(73) Assignee: Noroo Holdings Co., Ltd., Gyeonggi-do (KR)

(*) Notice: Subject to any disclaimer, the term of this patent is extended or adjusted under 35 U.S.C. 154(b) by 63 days.

(21) Appl. No.: 13/623,369

(22) Filed: Sep. 20, 2012

(65) Prior Publication Data

US 2013/0170014 A1 Jul. 4, 2013

(30) Foreign Application Priority Data

Dec. 29, 2011 (KR) .................. 10-2011-0145370

(51) Int. Cl.
| | |
|---|---|
| G02B 26/00 | (2006.01) |
| G09G 3/34 | (2006.01) |
| G02F 1/167 | (2006.01) |
| C09D 11/00 | (2014.01) |
| C09D 11/52 | (2014.01) |
| B05D 5/00 | (2006.01) |

(52) U.S. Cl.
USPC ........ 359/296; 345/107; 252/518.1; 252/582; 252/586; 427/531

(58) Field of Classification Search
CPC .......... G02B 26/00; G09G 3/34; G02F 1/167; C09D 11/00; B05D 5/00
USPC ............... 359/296, 452; 345/107; 427/58, 66, 427/101, 195, 261, 288, 525, 531, 532, 535, 427/543; 252/512–514, 582, 586–589; 347/9, 20, 54, 98, 101
See application file for complete search history.

(56) References Cited

U.S. PATENT DOCUMENTS

| | | | | |
|---|---|---|---|---|
| 3,013,897 | A | * 12/1961 | Cupery et al. | ................ 428/149 |
| 3,097,964 | A | * 7/1963 | Stowell | ................ 428/327 |
| 5,930,026 | A | 7/1999 | Jacobson et al. | |
| 5,961,804 | A | 10/1999 | Jacobson et al. | |
| 6,913,832 | B2 | * 7/2005 | Fan et al. | ................ 428/447 |
| 7,280,266 | B1 | * 10/2007 | Chopra et al. | ................ 359/296 |
| 7,344,750 | B2 | * 3/2008 | Chopra et al. | ................ 427/58 |
| 7,411,011 | B2 | * 8/2008 | Vincent et al. | ................ 523/201 |
| 7,846,500 | B2 | * 12/2010 | Vincent et al. | ................ 427/261 |

FOREIGN PATENT DOCUMENTS

WO WO-2005/036129 A2 4/2005

* cited by examiner

*Primary Examiner* — Loha Ben
(74) *Attorney, Agent, or Firm* — Harness, Dickey & Pierce

(57) ABSTRACT

Core-shell coated pigment particles are prepared by core-shell coating using pigment particles, at least one hydrophilic organometallic compound, at least one hydrophobic organometallic compound, distilled water and a solvent. Ink particles coated with an ionized organometallic compound are prepared by using the core-shell coated pigment particles, the solvent and a halogen compound. The ink particles, a dispersing agent and a dielectric liquid are mixed to prepare an ink composition. The ink composition has an electrophoresis property to exhibit an electric movement and has a good dispersibility in a dielectric liquid. The ink composition may be applied in a reflective type color display device.

19 Claims, 5 Drawing Sheets

INK COMPOSITIONS, METHODS OF PREPARING INK COMPOSITIONS AND DISPLAY PANELS INCLUDING INK COMPOSITIONS

BACKGROUND

Example embodiments of the invention relate to ink compositions, methods of preparing ink compositions and display panels including ink compositions. More particularly, example embodiments of the invention relate to electronic ink compositions used for reflective type display panels, methods of preparing the electronic ink compositions, and display panels including the electronic ink compositions.

A reflective type display device may display an image utilizing an external light without a light source while a liquid crystal display (LCD) device or a plasma display panel (PDP) device has an internal light source such as a back light. The reflective type display device uses the external light so that the reflective type display device may ensure low power consumption. Additionally, the reflective type display device may have a very thin thickness because the reflective type display device does not include the light source. However, the reflective type display device does not properly display various color images so that the reflective type display device has not been widely employed in various electric and electronic apparatuses.

In such circumstances, Amazon has succeeded in developing Amazon Kindle and the reflective type display device attracts much concern again. Amazon employed the reflective type display device in an e-book, Kindle. While using the e-book, power may be consumed only when changing screens and the power may not be consumed while reading a book. In addition, the e-book may have a merit of making eyes comfortable after reading for a long time like a paper. The Kindle was highly acclaimed on the market. Further, as the appearance of iPad visualizing a supply of diverse contents, possibilities on replacing the paper with a display device has attracted much attention.

The reflective type display device may be applied as a newspaper, a recyclable paper display device for a cellular phone, a portable TV screen and an electronic wall paper by using an electronic ink or an E-ink and by being manufactured through a known method. The technique on the electronic ink includes a particle-based electrophoresis display device, in which a plurality of charged particles moves here and there in a suspension liquid under an influence of an electric field.

Here, an electrophoresis phenomenon means a moving phenomenon of charged particles with an application of an electric field. When electrophoresis is generated in a liquid, the charged particles may move at a velocity determined by viscous drag, a charge, dielectric properties of the liquid, and a magnitude of applied electric field.

In an electrophoresis display device, a color may be determined by using particles having one or more colors dispersed in a dielectric liquid of different color. That is, when an electric field is applied to the particles having one or more colors, the charged particles may move to an electrode having an opposite sign with respect to the electric field. As the result, color change may be observed in visual.

The electrophoresis display device may have a good luminance and contrast, a wide viewing angle, a state bistability and low power consumption when compared to an LCD device. However, problems concerning an image quality deterioration of the display device after a long time has been disturbed the propagation of the electrophoresis display device. Particularly, the particles constituting the electrophoresis display device may have a precipitating tendency and so, a service life of the electrophoresis display device may become insufficient. In order to solve the problems, properties on a high contrast ratio, a rapid response time, and bistability may be required to be confirmed for the particles used in the electronic ink.

International Patent Publication No. PCT/WO2005/036129, and U.S. Pat. Nos. 5,961,804 and 5,930,026, to E-ink Cooperation in U.S.A., disclose a reflective type electronic ink having the above-described properties. A core-shell coating was performed on the surface portion of pigment particles through an acryl initiation reaction using lauryl acrylate having a good compatibility with a low dielectric liquid, and at least one non-compatible monomer selected from the group consisting of styrene, t-butyl methacrylate, N-vinyl pyrrolidone acrylic acid, acrylonitrile, methyl vinyl ketone and methacrylamide. However, since acryl monomers used to impart a charge may have a low polarity and may not overcome a driving velocity to achieve videos, an ionic type functionality having a high polarity may be required to be introduced.

In accordance with the above-described publications, an electronic ink having a particle dispersed liquid phase was obtained by using the core-shell coated particles along with a low dielectric liquid and a charge control agent (CCA). And a method of sealing the electronic ink into micro capsules is disclosed.

However, reflective type display devices manufactured by the above-described methods have lots of defects. Particularly, an electrophoresis display device including the micro capsules may be too sensitive to environmental changes (particularly, to humidity and temperature) because of the wall of the micro capsules. In addition, the electrophoresis display device including the micro capsules may have a weak scratch resistance because of the thin wall of the micro capsules and a large particle size.

In order to improve handling on the display device, the micro capsules may be required to be buried in a large amount of a polymer matrix. In this case, the distance between two electrodes may get farther and a response time may be slowed. In addition, the small loading amount of pigment particles may lower the contrast ratio.

While performing an encapsulation process, CCAs may diffuse to an interface of water/oil and an increase of a surface charge density on the pigment particles may become difficult. The low charge density or zeta potential of the pigment particles in the micro capsules may retard the response time. In addition, since the particle size of the micro capsules may be large and the distribution range thereof may be wide, an electrophoresis display device of this type may exhibit a worse dissolution and addressability while applying color. Therefore, a method of injecting a reflective type electronic ink by the method introducing the micro capsules may not be applied, but a method of injecting an ink into micro walls may be designed.

In accordance with the above-described common methods, the particles for the electronic paper of the display device may be obtained by applying the core-shell coating process using an acrylate monomer and by an initiation polymerization to impart a charge for an electrophoresis and to obtain dispersion stability. The particles may be sealed in a capsule by mixing with a low dielectric liquid. However, various problems including defects accompanied by the manufacturing process as described above and a defect of difficulty in dispersion into a low dielectric liquid may remain.

SUMMARY

Example embodiments provide ink compositions used for display devices.

Example embodiments provide methods of preparing ink compositions used for display devices.

Example embodiments provide mixed color ink compositions used for reflective type color display devices.

Example embodiments provide methods for preparing mixed color ink compositions for reflective type color display devices.

Example embodiments provide display devices including ink compositions.

Example embodiments provide methods of manufacturing display devices using ink compositions.

According to some embodiments, there is provided an ink composition including ink particles core-shell coated with at least one ionized hydrophilic organometallic compound and at least one hydrophobic organometallic compound, a dispersing agent and a dielectric liquid.

In example embodiments, the ink composition may include about 30 to 70 percent by weight of the ink particles, about 10 to 20 percent by weight of the dispersing agent and about 10 to 50 percent by weight of the dielectric liquid.

In example embodiments, the ink particles may include at least one electronic ink particles selected from the group consisting of white ink particles, black ink particles, red-colored ink particles, green-colored ink particles and blue-colored ink particles.

In example embodiments, the organometallic compound may include at least one metal atom or metalloid atom.

According to some embodiments, there is provided a method of preparing an ink composition. In the methods, core-shell coated pigment particles are prepared by core-shell coating using pigment particles, at least one hydrophilic organometallic compound, at least one hydrophobic organometallic compound, distilled water and a solvent. Then, ink particles coated with an ionized organometallic compound are prepared by using the core-shell coated pigment particles, the solvent and a halogen compound. After that, the ink particles, a dispersing agent and a dielectric liquid are mixed to prepare the ink composition.

In example embodiments, about 30 to 70 percent by weight of the pigment particles, about 10 to 30 percent by weight of the hydrophilic organometallic compound, about 5 to 20 percent by weight of the hydrophobic organometallic compound, about 10 to 40 percent by weight of the distilled water and about 30 to 50 percent by weight of the solvent may be used to prepare the core-shell coated pigment particles.

In example embodiments, the ink particles coated with the ionized organometallic compound may be prepared by using about 30 to 50 percent by weight of the core-shell coated pigment particles, about 20 to 50 percent by weight of the solvent and about 10 to 30 percent by weight of the halogen compound.

In example embodiments, about 30 to 70 percent by weight of the ink particles, about 10 to 20 percent by weight of the dispersing agent and about 10 to 50 percent by weight of the dielectric liquid may be used in the mixing step.

In example embodiments, the core-shell coated pigment particles may be prepared by using a sol-gel process at a surface portion of the pigment particles.

In example embodiments, the ink particles may include at least one electronic ink particles selected from the group consisting of white ink particles, black ink particles, red-colored ink particles, green-colored ink particles and blue-colored ink particles.

In example embodiments, the hydrophilic organometallic compound may include at least one compound for imparting a positive charge, selected from the group consisting of aminopropyl trimethoxysilane, aminopropyl triethoxysilane, aminopropylmethyl diethoxysilane, m-aminophenyl trimethoxysilane, n-methyl aminopropylmethyl dimethoxysilane, phenyl aminopropyl trimethoxysilane, aminoethyl aminopropyl trimethoxysilane, aminoethyl aminopropylmethyl dimethoxysilane, aminoethyl aminoisobutylmethyl dimethoxysilane, benzylethyl diaminopropyl trimethoxysilane and benzylethyl diaminopropyl triethoxysilane, or at least one compound for imparting a negative charge, selected from the group consisting of sodium trihydroxysilylpropylmethyl phosphonate, sodium methyl siliconate, potassium methyl siliconate, lithium methyl siliconate, sodium silicate, potassium silicate and titanium phosphate.

In example embodiments, the hydrophobic organometallic compound may include at least one selected from the group consisting of methyl trimethoxysilane, dimethyl trimethoxysilane, tetraorthosilicate and hydroxyl terminated polydimethylsiloxane. Preferably, a weight average molecular weight of the hydroxyl terminated polydimethylsiloxane may be in a range of about 500 to 5,000.

In example embodiments, the halogen compound may include at least one selected from the group consisting of methyl chloride, ethyl chloride, butyl chloride, pentyl chloride, hexyl chloride, heptyl chloride, octenyl chloride, nonenyl chloride, decanyl chloride, benzyl chloride, methyl sulfonate, ethyl sulfonate, butyl sulfonate and pentyl sulfonate.

According to some embodiments, there is provided a mixed color ink composition including a first ink composition including first ink particles core-shell coated with at least one ionized hydrophilic organometallic compound and at least one hydrophobic organometallic compound, a dispersing agent and a dielectric liquid; a second ink composition including second ink particles core-shell coated with at least one ionized hydrophilic organometallic compound and at least one hydrophobic organometallic compound, the dispersing agent and the dielectric liquid; and a low dielectric liquid.

In example embodiments, the mixed color ink composition may include about 10 to 50 percent by weight of the first ink composition, about 10 to 50 percent by weight of the second ink composition and about 30 to 80 percent by weight of the low dielectric liquid.

According to some embodiments, there is provided a display panel including a substrate including a cell structure defined by partitioned walls and an ink composition sealed in the cell structure. The ink composition includes ink particles core-shell coated with at least one ionized hydrophilic organometallic compound and at least one hydrophobic organometallic compound, a dispersing agent and a dielectric liquid.

According to some other embodiments, there is provided a display panel including a substrate including a cell structure defined by partitioned walls and a mixed color ink composition sealed in the cell structure. The mixed color ink composition includes a first single color ink composition obtained by dispersing uniformly ink particles core-shell coated with at least one ionized hydrophilic organometallic compound and at least one hydrophobic organometallic compound in a dielectric liquid, and a second single color ink composition having different color from the first single color ink composition.

According to some still other embodiments, there is provided a method of manufacturing a display panel. In the method, a first single color ink composition is prepared by dispersing uniformly ink particles core-shell coated with at least one ionized hydrophilic organometallic compound and at least one hydrophobic organometallic compound in a dielectric liquid. A second single color ink composition having a different color from the first single color ink composition is prepared. Then, a mixed color ink composition is prepared by mixing the first and second single color ink compositions. After that, a pixel is formed by injecting the mixed color ink composition into a cell structure.

In accordance with the present inventive concept, an organometallic monomer having a good affinity with a low dielectric substance may be introduced to improve dispersing stability and a hydrophilic organometallic monomer having a high polarity also may be introduced to impart good electrophoresis properties.

Color pigment particles prepared by applying the above-described concept may be uniformly dispersed in a low dielectric liquid to form a single color electronic ink. Two or more of the appropriate single color electronic inks may be mixed to prepare an electronic color ink for an electrophoresis type.

Thus prepared electronic color ink may be injected by a silk screen printing method into a cell array of a micro wall structure manufactured by using a master mold having micro wall structure cells or manufactured by using a photoresist, using a thermosetting or thermoplastic resin and a UV curable resin composition. After that, the cell array of the micro wall structure including the ink may be sealed using a thermosetting composition or a UV curable compound to manufacture a panel.

Inorganic or organic pigment particles may be used as the color pigment particles for the preparation of the color electronic ink and may be imparted with a high charge on the surface portion of the particles so as to move rapidly at a low voltage. A functionalized organometallic compound is used for the core-shell coating of the pigment particles by a sol-gel process and then ionized using a halogen compound to provide a good dispersing property in a low dielectric liquid. A single color electronic ink may be prepared using thus obtained color pigment particles core-shell coated with the ionized organometallic compound along with a low dielectric liquid and a dispersing agent. Then, two or more single colored particles may be mixed to prepare a mixed color electronic ink, which may illustrate an electric movement and color.

Thus obtained mixed color electronic ink may be injected or coated into or on micro walls by means of diverse methods to obtain pixels. Each of the injected electronic ink into cells may have different charges from each other and may have an electrically high mobility when dispersed in a low dielectric liquid. Therefore, a rapid and clear change to a desired color may be accomplished even at a low voltage.

In accordance with the present inventive concept, an ink composition for injecting an electronic ink using a micro cup in an electrophoresis display field may also be provided. A color display panel may be manufactured by using a panel manufactured by using the electronic ink and by means of an injecting or a coating method in accordance with exemplary embodiments.

DETAILED DESCRIPTION OF EMBODIMENTS

Figure 1:
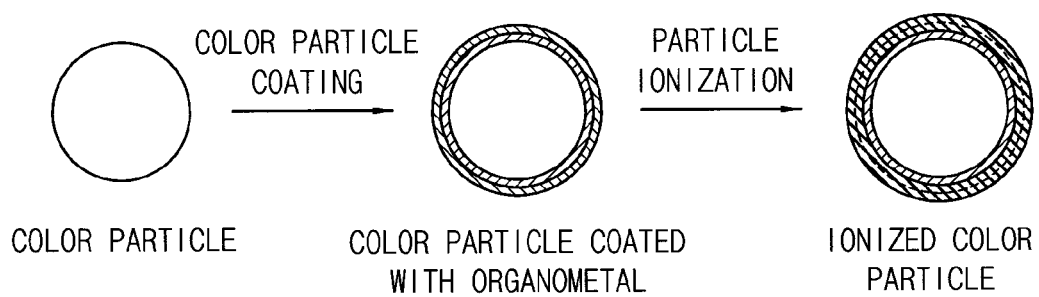
FIG. 1 is a mimetic diagram illustrating processes of firstly coating an organometal on a surface of a color particle and then secondly ionizing the coated color particle.

Various example embodiments will be described more fully, in which some example embodiments are shown. The invention may, however, be embodied in many different forms and should not be construed as limited to the example embodiments set forth herein. Rather, these example embodiments are provided so that this description will be thorough and complete, and will fully convey the scope of the invention to those skilled in the art. In the drawings, the sizes and relative sizes of layers and regions may be exaggerated for clarity.

As used herein, the term "and/or" includes any and all combinations of one or more of the associated listed items. It will be understood that, although the terms first, second, third etc. may be used herein to describe various elements and/or components, these elements and/or components should not be limited by these terms. These terms are only used to distinguish one element or component from another. Thus, a first element or component discussed below could be termed a second element or component without departing from the teachings of the invention.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Hereinafter, example embodiments on ink compositions, methods of preparing ink compositions and display panels including ink compositions in accordance with example embodiments will be described in detail.

In accordance with the present inventive concept, a surface charge may be imparted to color particles to enable an electric movement, and other properties for electrophoresis such as an electric bistability, dispersibility in a low dielectric liquid, dispersion stability, contrast, color reproducibility, driving stability, etc. may be improved. Different from the common organic acrylate polymer coating, the method in exemplary embodiments may introduce a sol-gel process of which control of processing time and post-treating process may be simple. The sol-gel polymerizing reaction will be illustrated in following reaction scheme 1. In reaction scheme 1, R represents an organic group and M represents a metal.

Reaction Scheme 1: Sol-Gel reaction process

1. Hydrolysis

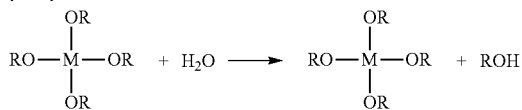

2. Condensation

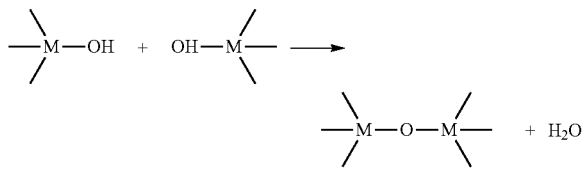

3. Curing reaction

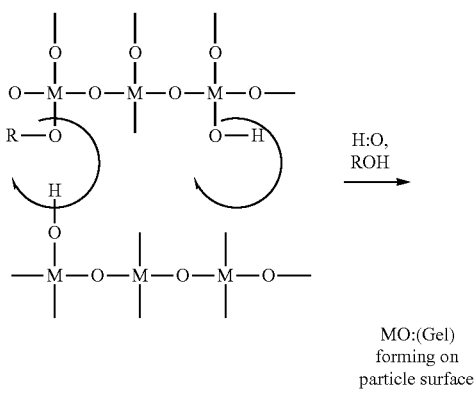

MO:(Gel) forming on particle surface

In accordance with the process of the present inventive concept, the process may be simple when compared to common processes since a high temperature is not required (possible at room temperature) and water is used. Particularly, the surface portion of color pigment particles may be core-shell coated with an organometallic compound by using at least one hydrophilic organometallic compound to impart a high charge onto the surface portion of the color particles and to achieve a rapid movement of the color particles in a low dielectric liquid even by a low voltage application, and at least one hydrophobic organometallic compound to facilitate a dispersion in a low dielectric liquid used for preparing an electronic ink, and by a sol-gel process.

FIG. 1 is a mimetic diagram illustrating processes for firstly coating an organometal on a surface of color particles and secondly ionizing the coated color particles.

Exemplary embodiments on pigment particles (color particles) core-shell coated with a cationized organometallic compound are illustrated as following Chemical Formulae 1 and 2.

Chemical Formula 1

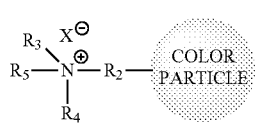

In Chemical Formula 1, $R_2$ represents an organic group having 3 to 10 carbons, $R_3$ and $R_4$ independently represent H or an organic group having 1 to 4 carbons, $R_5$ represents an organic group having 1 to 10 carbons or a benzyl group, and X represents Cl, Br or F.

Chemical Formula 2

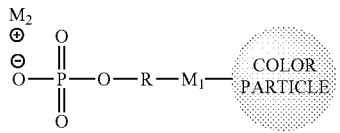

In Chemical Formula 2, $M_1$ represents Si, Ti or Al, $M_2$ represents Na or K, and R represents an organic chain.

Different from the common method of thickly coating pigments with an organic monomer to lower the weight of the pigment and to control bistability and dispersion stability, pigments may be core-shell coated on a surface portion thereof with an ionized organometallic compound having diverse functionalities (hydrophobicity, hydrophilicity, high polarity, etc.) by means of a sol-gel process. According to the sol-gel process, the process may be simple and a post-treating process may be scarcely performed. In addition, an electrophoresis property, an electric bistability, dispersibility and dispersion stability in a low dielectric liquid, etc. may be achieved at the same time. The low dielectric liquid may commonly include a hydrocarbon, fluorine or silicon. Since these compounds may have a very low surface tension and be very highly hydrophobic, common pigments may be difficult to be dispersed and dispersion stability thereof may be very weak.

However, in accordance with exemplary embodiments, an organometallic monomer having a good affinity with a low dielectric liquid may be introduced to improve the dispersion stability and a hydrophilic organometallic monomer having a high polarity also may be introduced to impart a good electrophoresis property.

Thus prepared color pigment particles having an advantageous dispersing property in the low dielectric liquid, may be homogeneously dispersed in the low dielectric liquid to form a single color electronic ink. After that, two or more appropriate single color electronic inks may be mixed to obtain an electronic color ink for electrophoresis.

Thus prepared electronic color ink may be injected by a silk screen printing method into a cell array of a micro wall, i.e. a partition structure formed by using a master mold having partitioned wall structure cells and formed by using a thermosetting or thermoplastic resin and a UV curable resin composition. The cell array of the micro wall structure including the injected ink may be sealed using a thermosetting resin or a UV curable compound to form a panel. Thus formed cell array of the micro wall structure may be post-cured after being removed from the master mold. The sealing may be performed by using a composition of a viscous/adhesive agent or a curable layer.

Hereinafter, a mixed color electronic ink, a cell array of a micro wall structure and a manufacturing of a panel may be explained separately.

The ink composition in accordance with the present inventive concept may include ink particles core-shell coated with at least one ionized hydrophilic organometallic compound and at least one hydrophobic organometallic compound, a dispersing agent and a dielectric liquid.

The ink particles may include white ink particles, black ink particles, red colored ink particles, green colored ink particles or blue colored ink particles.

Preferably, a single color electronic ink may be prepared by mixing about 30 to 70 percent by weight of ink particles coated with ionized organometallic compound, about 10 to 20 percent by weight of a dispersing agent and about 10 to 50 percent by weight of a low dielectric liquid.

In exemplary embodiments, white pigments applicable for preparing the white ink particles may include $TiO_2$ having an anatase or a rutile crystal structure. These materials may be used alone or as a mixture type.

In exemplary embodiments, black pigments applicable for preparing the black ink particles may include particles of a carbon black, a carbon nano tube, manganese ferrite oxide (MnFe oxide), copper chromium oxide (CuCr oxide), ferric oxide ($Fe_2O_3$), etc. These materials may be used alone or as a mixture type.

In exemplary embodiments, red colored pigments applicable for preparing the red ink particles may include particles of a perylene compound pigment such as C. I. Pigment Red 190 (C.I. No. 71140), C. I. Pigment Red 224 (C.I. No. 71127), C. I. Pigment Violet 29 (C.I. No. 71129), etc. a perinon compound pigment such as C. I. Pigment Orange 43 (C.I. No. 71105), C. I. Pigment Red 194 (C.I. No. 71100), etc. a quinacridone compound pigment such as C.I. Pigment Violet 19 (C.I. No. 73900), C. I. Pigment Violet 42, C. I. Pigment Red 122 (C.I. No. 73915), C. I. Pigment Red 192, C. I. Pigment Red 202 (C.I. No. 73907), C. I. Pigment Red 207 (C.I. Nos. 73900 and 73906), C. I. Pigment Red 209 (C.I. No. 73905), etc., C.I. Pigment Red 260 (C.I. No. 73900/73920), etc. These materials may be used alone or as a mixture type.

In exemplary embodiments, green colored pigments applicable for preparing the green ink particles may include C. I. Pigment Green 7 (C.I. No. 74260), C. I. Pigment Green 36 (C.I. No. 74265), etc. These materials may be used alone or as a mixture type.

In exemplary embodiments, blue colored pigments applicable for preparing the blue ink particles may include an indanthrone compound pigment such as C. I. Pigment Blue 60 (C.I. No. 69800), etc., a phthalocyanin compound pigment such as C. I. Pigment Blue 16 (C.I. No. 74100), C. I. Pigment Blue 75 (C.I. No. 74160:2), 15 (C.I. No. 74160), etc., a triaryl carbonium compound pigment such as C. I. Pigment Blue 56 (C.I. No. 42800), C. I. Pigment Blue 61 (C.I. No. 42765:1), etc., a dioxazine compound pigment such as C. I. Pigment Violet 23 (C.I. No. 51319), C. I. Pigment Violet 37 (C.I. No. 51345), etc., a sulfur compound, etc. These materials may be used alone or as a mixture type.

The amount of the pigment may be preferably in a range of about 30 to 70 percent by weight based on the total amount of the composition. When the amount of the pigment is less than about 30 percent by weight, a yield may be low, the thickness of the core-shell may be too small, or a uniform core-shell coating of the pigments may not be achieved. When the amount of the pigment exceeds about 70 percent by weight, the thickness of the core-shell may become too large to deteriorate physical properties. Accordingly, an appropriate amount of the pigment may be about 30 to 70 percent by weight.

The organometallic compound used for the core-shell coating on the surface of the color particles with the ionized organometallic compound may preferably include at least one of a silicon metal or a metalloid. The metal or metalloid applicable in exemplary embodiments may include Si, Al, Ti, Zr, etc.

In accordance with the present inventive concept, core-shell coated pigment particles may be prepared by core-shell coating using pigment particles, at least one hydrophilic organometallic compound, at least one hydrophobic organometallic compound, distilled water and a solvent, preparing ink particles coated with an ionized organometallic compound using the core-shell coated pigment particles, the solvent and a halogen compound, and then mixing the ink particles, a dispersing agent and a dielectric liquid.

In accordance with exemplary embodiments, in order to prepare color particles for black, red, green and blue colored electronic ink, the surface of the pigment particles may be core-shell coated using about 30 to 70 percent by weight of pigment particles such as white, black, red, green or blue particles, about 10 to 30 percent by weight of at least one hydrophilic organometallic compound, about 5 to 20 percent by weight of at least one hydrophobic organometallic compound, about 10 to 40 percent by weight of distilled water and about 30 to 50 percent by weight of a solvent by means of a sol-gel process.

In order to impart a high charge onto the surface portions of the pigment particles and to achieve a rapid electric movement at a low voltage, the white, black, red, green and blue single color particles core-shell coated by the above-described method may be treated as follows. About 30 to 50 percent by weight of thus prepared organometallic compound coated particles, about 20 to 50 percent by weight of a solvent and about 10 to 30 percent by weight of a halogen compound may react to produce ionized organometallic compound coated color electronic ink particles.

The hydrophilic compound for imparting a positive charge may include aminopropyl trimethoxysilane, aminopropyl triethoxysilane, aminopropylmethyl diethoxysilane, m-aminophenyl trimethoxysilane, n-methyl aminopropylmethyl dimethoxysilane, phenyl aminopropyl trimethoxysilane, aminoethyl aminopropyl trimethoxysilane, aminoethyl aminopropyl methyl dimethoxysilane, aminoethyl aminoisobutylmethyl dimethoxysilane, benzylethyl diaminopropyl trimethoxysilane and benzylethyl diaminopropyl triethoxysilane, etc. In addition, the hydrophilic compound for imparting a negative charge may include sodium trihydroxysilylpropylmethyl phosphonate, sodium methyl siliconate, potassium methyl siliconate, lithium methyl siliconate, sodium silicate, potassium silicate, titanium phosphate, etc. These compounds may be used alone or as a mixture type.

When the amount of the hydrophilic organometallic compound is less than about 10 percent by weight, an electric charge on the surface portion of the pigment may be low and the electric movement in the low dielectric liquid may be slow to increase a driving voltage. When the amount of the hydrophilic organometallic compound exceeds about 30 percent by weight, the amount of the hydrophobic organometallic compound may be relatively decreased and dispersion in the low dielectric liquid may become difficult. Accordingly, the amount of the hydrophilic organometallic compound may be preferably in a range of about 10 to 30 percent by weight.

The hydrophobic compound in accordance with exemplary embodiments may include methyl trimethoxysilane, dimethyl trimethoxysilane, tetraorthosilicate, hydroxy terminated polydimethyl siloxane, etc. These compounds may be used alone or in a mixture type. When the amount of the hydrophobic compound is less than about 5 percent by weight, dispersing of the compound in a low dielectric liquid may not be easy and when the amount exceeds about 20 percent by weight, the relative amount of the hydrophilic organometallic compound may decrease and so, a driving voltage may be increased. In addition, a driving velocity may decrease. Accordingly, the amount of the hydrophobic compound may be preferably in a range of about 5 to 20 percent by weight.

When the amount of the distilled water is less than about 10 percent by weight, a hydrolysis reaction and a condensation reaction may not completely proceed and non-reacted metal alkoxy monomers may be present. When the amount of the distilled water exceeds about 40 percent by weight, a reaction may proceed too rapidly and gelation may be generated. Accordingly, preferred amount of the distilled water may be in a range of about 10 to 40 percent by weight.

The solvent in accordance with exemplary embodiments may include methyl alcohol, ethyl alcohol, isopropyl alcohol, acetone, methyl ethyl ketone, methyl oxitol, dioxitol, cellosolve acetate, butyl cellosolve acetate, ethylene glycol, butyl glycol, methyl diglycol, ethyl glycol, glycerine, diethyl ether, diisopropyl ether, propylene glycol, glycol monoacetate, methyl glycol acetate, ethyl glycol acetate, butyl cellosolve acetate, etc. These compounds may be used alone or as a mixture type. When the amount of the solvent is less than about 30 percent by weight, water and the metal alkoxy monomer may not be mixed homogeneously and a reaction may proceed slowly, or the non-reacted metal alkoxy monomer may remain. When the amount of the solvent exceeds about 50 percent by weight, removal of the solvent in a subsequent process may be difficult. Accordingly, the preferred amount of the solvent may be in a range of about 30 to 50 percent by weight.

In order to impart even more charges, the coated particles may be ionized through a reaction with a halogen compound. Examples on the halogen compounds may include a chloride compound such as methyl chloride, ethyl chloride, butyl chloride, pentyl chloride, hexyl chloride, heptyl chloride, octenyl chloride, nonenyl chloride, decanyl chloride and benzyl chloride; and a sulfonate compound such as methyl sulfonate, ethyl sulfonate, butyl sulfonate and pentyl sulfonate. When the amount of the halogen compound is less than about 10 percent by weight, the ionization may not completely proceed and when the amount exceeds about 30 percent by weight, remaining halogen compound during preparing a single ink may deteriorate properties of the single electronic ink. Accordingly, the preferred amount of the halogen compound may be in a range of about 10 to 30 percent by weight.

The surface portion of thus obtained color electronic ink particles may be core-shell coated with hydrophobic organometallic compounds and so, dispersing in a low dielectric liquid having a hydrophobic property may be easy. In addition, since the surface portion of the particles may be core-shell coated with the ionized organometallic compound, a rapid movement of the particles may be achieved at a low voltage.

In order to prepare a single color electronic ink, the color particles may be mixed with about 30 to 70 part by weight of white, black, red, green or blue particles coated with the ionized organometallic compound, about 10 to 20 percent by weight of a dispersing agent and about 10 to 50 percent by weight of a low dielectric liquid.

In accordance with exemplary embodiments, the white, black, red, green and blue color particles core-shell coated with ionized organometallic compounds as described above may be mixed with about 30 to 70 percent by weight of the white, black, red, green or blue particles coated with ionized organometallic compound, about 10 to 20 percent by weight of a dispersing agent and about 10 to 50 percent by weight of a low dielectric liquid, and then dispersed to obtain a single color electronic ink.

When the amount of the white, black, red, green or blue single color particles is less than about 30 percent by weight, the amount of the pigment is too small and the control of a mixing ratio with the solvent while forming a mixed color ink may become difficult and a viscosity may be too low to deteriorate a dispersing efficiency. In the meantime, when the amount of the white, black, red, green or blue single color particles exceeds about 70 percent by weight, the amount of the pigment is too high and the control of a mixing ratio with the solvent while a mixed color ink may become difficult and a viscosity may be to high to deteriorate a dispersing efficiency. Accordingly, an appropriate amount of the single color particles may be in a range of about 30 to 70 percent by weight.

Examples of the dispersing agent applicable in the present inventive concept may include a dispersing agent having a high viscosity such as Solspers 5000, Solspers 8000, Solspers 11200, Solspers 12000, Solspers 13300, Solspers 20000, Solspers 22000, Solspers 32000, Solspers 38500, Solspers 39000, Solspers 40000, Solspers 41000, Solspers 41090, Solspers 43000, Solspers 44000, Solspers 46000, Solspers 53000, etc. purchased by Solspers Co. When the amount of the dispersing agent is less than about 10 percent by weight, a dispersing efficiency may be lowered and when the amount exceeds about 20 percent by weight, the excessive amount of the dispersing agent may affect adversely during driving the electronic ink. Accordingly, an appropriate amount of the dispersing agent may be in a range of about 10 to 20 percent by weight.

In accordance with exemplary embodiments, the dielectric liquid may include ISOPA C, ISOPA E, ISOPA G, ISOPA M, ISOPA H, and ISOPA L by EXXON Co.; a fluorine-type low dielectric liquid such as Halocarbon 0.8 and Halocarbon 1.8 by Halocarbon Co.; and FC-40, FC-43, FC-70, FC-72, FC-84, FC-87, FC-3283, etc. by 3M Co. When the amount of the dielectric liquid is less than 10 percent by weight, the amount of the dielectric liquid may be too small and the control of a mixing ratio of the dielectric liquid for preparing a mixed ink may be difficult. In addition, the viscosity may be too low and an efficient dispersion may be difficult. When the amount of the dielectric liquid exceeds 50 percent by weight, the amount of the dielectric liquid may be too large and the control of the mixing ratio of the dielectric liquid for preparing the mixed color ink may be difficult. Accordingly, an appropriate amount of the dielectric liquid may be in a range of about 10 to 50 percent by weight.

In order to manufacture a mixed color electronic ink, about 10 to 50 percent by weight of two or more of thus prepared white, black, red, green or blue single color electronic ink, and about 30 to 80 percent by weight of a low dielectric liquid may be mixed. A refection type color electronic ink having electrophoresis properties and having electronically changeable color phase thereof may be obtained.

Since the single color electronic inks may have a different charge and mobility, two or more of the single color inks may be mixed to achieve the phase change. That is, about 10 to 50 percent by weight of at least two of the white, black, red, green or blue single color electronic ink and about 10 to 50 percent by weight of the low dielectric liquid may be used to prepare the mixed color electronic ink.

When the amount of the white, black, red, green or blue single color electronic ink is less than about 10 percent by weight, the amount of the single color electronic ink may be insufficient and a covering efficiency and clarity of color may be decreased. When the amount exceeds about 50 percent by weight, the amount of the single color electronic ink may be too large and the color of the remaining color mixed may be affected and the color clarity of the remaining color may be deteriorated. Accordingly, an appropriate amount of the single color ink may be in a range of about 10 to 50 percent by weight.

As for the low dielectric liquid, one or more dielectric liquids used for the single color ink may be used. When the amount of the low dielectric liquid is less than about 10 percent by weight, the viscosity of the ink may be increased and the mobility of the pigments may be decreased. So, a driving velocity and a driving voltage may be increased. When the amount of the low dielectric liquid exceeds about 50 percent by weight, the viscosity of the mixed color ink may be too low and a precipitation and separation of the pigments may be generated while storing. Accordingly, an appropriate amount of the low dielectric liquid may be in a range of about 10 to 50 percent by weight.

Hereinafter, a method of manufacturing a color electronic ink for applying in a reflective type color display device will be described in detail. However, it should be understood that the present inventive concept may not be limited to the following exemplary embodiments. In the following methods, the amount represents percent by weight.

Examples

1. Preparation of Particles Core-Shell Coated with Ionized Organometallic Compound and Electronic Ink (1) First Dispersion of Particles About 40 percent by weight of color (white, black, red, green or blue) pigment, about 40 percent by weight of isopropyl alcohol and about 20 percent by weight of polyvinyl alcohol (PVA) were mixed and then rapidly stirred with 0.5 mm zirconia beads at about 3,000 rpm for 3 hours. After the stirring, the zirconia beads and a dispersed product were separated from each other by using a 50 an filter.

(2) Core-Shell Coating Positively Charged Color Particles with Organometallic Compound Into a flask equipped with a dropping apparatus, a refluxing apparatus and a heating source, about 50 percent by weight of the first dispersion completed solution of the particles from 1-(1), about 10 percent by weight of aminoethyl aminopropyl methyl dimethoxy silane, about 10 percent by weight of hydroxyl terminated polymethyl siloxane, about 20 percent by weight of ethyl alcohol and about 10 percent by weight of distilled water were added. The reaction mixture was stirred at room temperature for 12 hours to perform a reaction.

(3) Ionization of the Positively Charged Color Particles

About 50 percent by weight of the particles prepared from 1-(2) and about 30 percent by weight of ethyl alcohol were added, and then, the reactant was heated to about 70° C. About 20 percent by weight of benzyl chloride was dropped for about 30 minutes. Then, the reaction was kept for about 4 hours. Ionized color particles were separated into a liquid phase and a particle phase by means of a centrifugal separation. The particle phase was dried in a vacuum oven at about 50° C., for about 12 hours to completely remove remaining ethyl alcohol.

(4) Core-Shell Coating of Negatively Charged Particles

Into a flask equipped with a dropping apparatus, a refluxing apparatus and a heating source, about 50 percent by weight of the first dispersion completed solution of the particles, about 10 percent by weight of sodium trihydroxysilyl propylmethylphosphonate, about 10 percent by weight of methyl trimethoxysilane, about 20 percent by weight of ethyl alcohol and about 10 percent by weight of distilled water were added. Then, the reactant was stirred at room temperature for about 12 hours.

(5) Preparation of Single Color Electronic Ink

About 50 percent by weight of dried color particles, about 20 percent by weight of a dispersing agent, BYK-106 and about 30 percent by weight of FC-30 by 3M Co. were homogeneously mixed and then dispersed by using a 0.3 mm bead dyno mill for about 3 hours.

2. Preparation of Single Color Electronic Ink (1) Preparation of White Single Color Electronic Ink In order to prepare positive charge particles of $TiO_2$ R-706 particles by Dupont Co., the $TiO_2$ R-706 particles were dispersed by the method described in 1-(1) and then, the surface portion of the $TiO_2$ R-706 particles was core-shell coated with an organometallic compound by the method described in 1-(2). Ionization process as described in 1-(3) was performed and a color ink was prepared by the method described in 1-(5).

(2) Preparation of Black Single Color Electronic Ink

In order to impart a negative charge, carbon black particles were dispersed by the method described in 1-(1) and then, the surface portion of the carbon black particles were core-shell coated with an ionized organometallic compound by the method described in 1-(4) and a color ink was prepared by the method described in 1-(5).

(3) Preparation of Red Single Color Electronic Ink

In order to impart a negative charge, pigment red 224 particles were dispersed by the method described in 1-(1) and then, the surface portion of the carbon black particles were core-shell coated with an ionized organometallic compound by the method described in 1-(4) and a color ink was prepared by the method described in 1-(5).

(4) Preparation of Green Single Color Electronic Ink

In order to impart a negative charge, pigment green 36 particles were dispersed by the method described in 1-(1) and then, the surface portion of the carbon black particles were core-shell coated with an ionized organometallic compound by the method described in 1-(4) and a color ink was prepared by the method described in 1-(5).

(5) Preparation of Blue Single Color Electronic Ink

In order to impart a negative charge, pigment blue 61 particles were dispersed by the method described in 1-(1) and then, the surface portion of the carbon black particles were core-shell coated with an ionized organometallic compound by the method described in 1-(4) and a color ink was prepared by the method described in 1-(5).

3. Preparation of Two Color Mixed Ink

White Color Ink as a Base

About 40 percent by weight of positively charged white color ink, about 20 percent by weight of negatively charge black, red, green or blue single color electronic ink and about 40 percent by weight of Halocarbon 1.8 were mixed and then dispersed in a basket-type sonicator to prepare the two color mixed ink.

The base color ink may not be limited to the white color ink, however, the black, red, green or blue color ink may be applied as the base color ink as occasion demands.

Comparative Examples

1. Preparation of Particles Core-Shell Coated with Acrylate and Electronic Ink (1) First Dispersion of Particles The same process described in Examples was performed to prepare the first dispersion of particles.

(2) Core-Shell Coating of Particle

Into a flask equipped with a dropping apparatus, a refluxing apparatus and a heating source, about 30 percent by weight of a first dispersed particle solution, about 20 percent by weight of methyl methacrylate (MMA), about 40 percent by weight of ethyl alcohol, about 0.5 percent by weight of 2,2-azobisisobutyronitrile and about 9.5 percent by weight of methacryl amide were added and then heated to about 70° C. The reaction was kept for about 6 hours.

(3) Core-Shell Coating of Particle II

Into a flask equipped with a dropping apparatus, a refluxing apparatus and a heating source, about 30 percent by weight of a first dispersed particle solution, about 20 percent by weight of methyl methacrylate (MMA), about 40 percent by weight of ethyl alcohol, about 0.5 percent by weight of 2,2-azobisisobutyronitrile and about 9.5 percent by weight of methacrylic acid were added and then heated to about 70° C. The reaction was kept for about 6 hours.

(5) Post-Treating Process of Particles

After completing the processes (2) and (3), the particles core-shell coated with acrylate were washed ten or more times using distilled water and five or more times using ethyl alcohol to remove non-reacted acryl monomer. A portion of ethyl alcohol was removed using a vacuum filter and thus obtained particles were completely dried using a freeze drier to obtain powder.

(5) Preparation of Single Color Electronic Ink

About 50 percent by weight of dried color particles, about 20 percent by weight of a dispersing agent, BYK-106 and about 30 percent by weight of FC-30 by 3M Co. were homogeneously mixed and then dispersed by using a 0.3 mm bead dyno mill for about 3 hours.

2. Preparation of Electronic Ink (1) Preparation of White Single Color Electronic Ink $TiO_2$ R-706 particles by Dupont Co. were dispersed by the method described in 1-(1) and then, the surface portion of the $TiO_2$ R-706 particles was core-shell coated by the method described in 1-(2). Post-treating process as described in 1-(4) was performed and a color ink was prepared by the method described in 1-(5).

(2) Preparation of Black Single Color Electronic Ink

Carbon black particles were dispersed by the method described in 1-(1) and then, the surface portion of the carbon black particles were core-shell coated by the method described in 1-(3). Post-treating process as described in 1-(4) was performed and a color ink was prepared by the method described in 1-(5).

(3) Preparation of Red Single Color Electronic Ink

Pigment red 224 particles were dispersed by the method described in 1-(1) and then, the surface portion of the pigment red 224 particles were core-shell coated by the method described in 1-(3). Post-treating process as described in 1-(4) was performed and a color ink was prepared by the method described in 1-(5).

(4) Preparation of Green Single Color Electronic Ink

Pigment green 36 particles were dispersed by the method described in 1-(1) and then, the surface portion of the pigment green 36 particles were core-shell coated by the method described in 1-(3). Post-treating process as described in 1-(4) was performed and a color ink was prepared by the method described in 1-(5).

(5) Preparation of Blue Single Color Electronic Ink

Pigment blue 61 particles were dispersed by the method described in 1-(1) and then, the surface portion of the pigment blue 61 particles were core-shell coated by the method described in 1-(4). Post-treating process as described in 1-(4) was performed and a color ink was prepared by the method described in 1-(5).

3. Preparation of Two Color Mixed Ink

White Color Ink as a Base

About 40 percent by weight of the white color ink coated with acrylate, about 20 percent by weight of black, red, green or blue single color electronic ink and about 40 percent by weight of Halocarbon 1.8 were mixed and then dispersed in a basket-type sonicator to prepare the two color mixed ink.

II. Manufacturing of Panel Using a Cell Array Having Partition Structure

Manufacturing methods of a partition structure of cells for driving may be classified into a UV curing type structure forming method and a mesh applying type structure forming method.

The UV curing type partition structure forming method may include a method using a photoresist widely applied in a semiconductor or other display device fields, an electroforming method using a metal, and a forming method of a partition structure cup array by using a master (mold) formed by using silicon, etc. and by using a UV curable compound.

The cell size of the partition structure may be determined by a required condition of picture for a final application. The control of the size of a unit cell may be accomplished by changing a photomask pattern or a master structure design.

Constitution and Function of Cell Forming Material

The micro cells may be required to have a structural property and a chemical property appropriate for applying a manufacturing process of an electronic paper and for maintaining a finally constituting material. Accordingly, contraction percentage after UV curing, adhesiveness with a base material, suitability with an electronic ink and intensity after curing, etc. may be considered. In order to satisfy the above-described factors, selection of a material constituting the UV curing compound (composition) may be important. Among the materials constituting the UV curable composition satisfying the above-described factors, the most important one is a selection of an oligomer. The oligomer may include an epoxy acrylate oligomer and a urethane acrylate oligomer as a base along with one or more of a polyester acrylate oligomer and a silicon acrylate oligomer. The number of functional groups may be appropriately selected from mono-functional or poly functional oligomers according to a process condition, and a dosage of UV.

The monomer also may be selected considering the workability and contraction percentage of the UV curable composition as the oligomer and may include mono-functional or poly functional acrylate monomers. UV light initiator may include benzophenone-based compound, benzoin, benzoin ether-based compound, benzyl ketal-based compound, acetophenone-based compound, antraquinone-based compound, dioxoxantone-based compound, etc. These compounds may be used alone or in a mixture type thereof. Considering the workability of the partitioned cell forming process and the quality of the cells, an additive such as a defoaming agent, a surface controlling agent, etc. may be included.

Method and Function of Manufacturing Partitioned Cell

The manufacture of the partitioned cell array may be performed by one of a unit process (a batch process) or a continuous process. Examples for the manufacturing are as follows.

Manufacturing Partitioned Cell Array Using a Master

FIGS. 2A to 2D are cross-sectional views illustrating a method of manufacturing a cell array having a partition structure using a master.

Figure 2A:
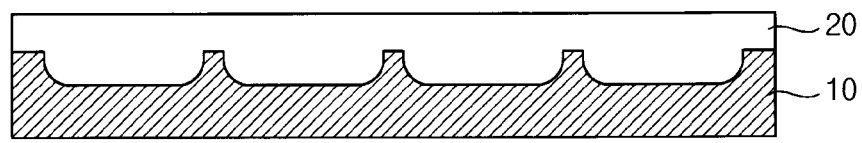
FIGS. 2A to 2D are cross-sectional views illustrating a method of manufacturing a cell array having a partition structure using a master.
Figure 2B:
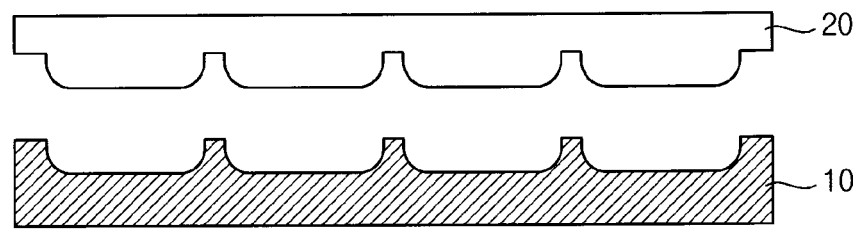
Figure 3:
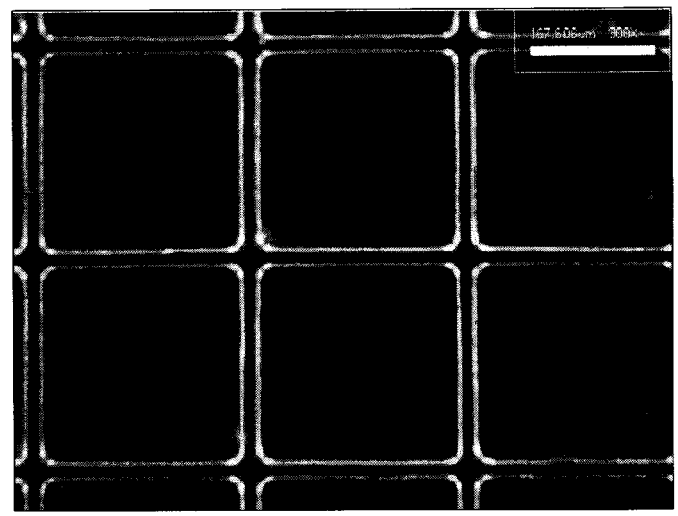
FIG. 3 is a plan view illustrating the master in FIG. 2A.

Referring to FIG. 2A, a master mold 10 including a partition structure formed by an intaglio or an embossed carving may be formed. FIG. 3 is a plan view illustrating the master in FIG. 2A. Then, a mold material layer may be coated using the master mold and then, removed to obtain a soft mold 20 as illustrated in FIG. 2B.

Figure 2C:
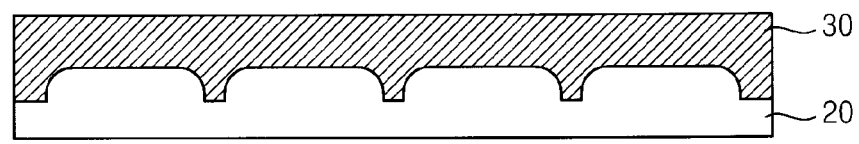
Figure 2D:
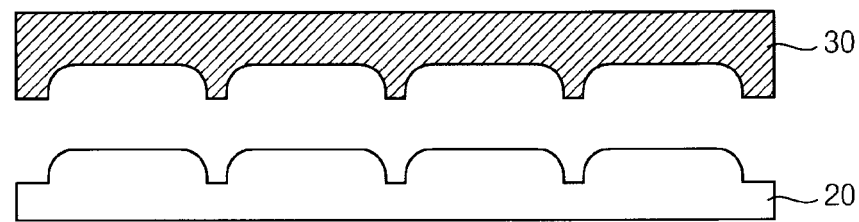
Figure 4:
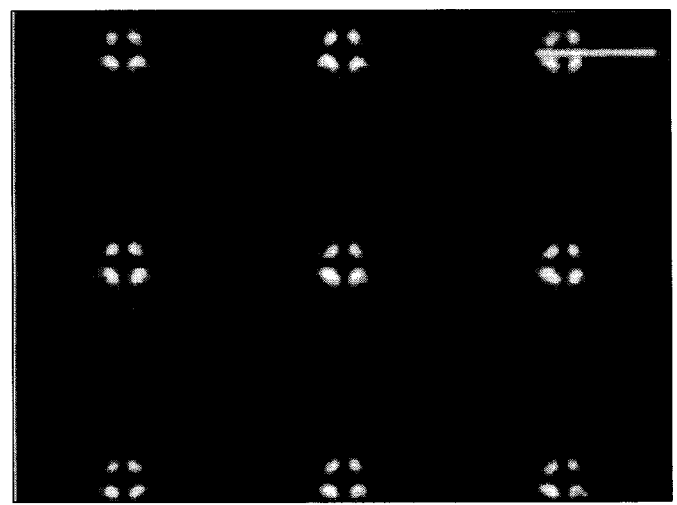
FIG. 4 is a plan view illustrating the cell array having the partition structure in FIG. 2D.

Referring to FIG. 2C, a UV curing solution may be coated on the soft mold 20 to form a curing solution layer 30. Referring to FIG. 2D, the curing solution layer 30 may be exposed to a certain amount of UV for curing. After the curing, the curing solution layer 30 may be removed. FIG. 4 is a plan view illustrating the cell array having the partition structure in FIG. 2D.

The manufacturing process may be performed continuously by using a belt and a Master drum.

Thus formed partition structure cell may have a curvature shaped upper portion. The micro walls having this shape may prevent staining the upper portion of the cells during injecting an ink and so, a cleaning (washing) process on the upper portion after injecting the ink while manufacturing an electronic paper panel may be omitted. In addition, this design may widen a fixed margin while performing the ink injection process.

In accordance with another exemplary embodiment, the micro walls may be formed by using a photoresist as used in a semiconductor field or other display device field. The partition forming material may include a UV curable composition and a coating method may include a spin coating, a dispensing method, etc. The coated photoresist may be exposed and developed/etched or may be printed into a pattern to form a partitioned array. Examples for forming the micro walls may include a screen printing method, a sand blast method, a lift-off method, a photolithography, etc.

Example on Forming Micro Walls Using Photoresist

Figure 5A:
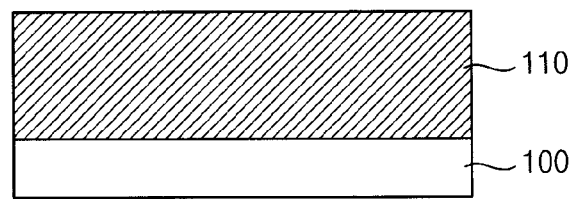
FIGS. 5A to 5C are cross-sectional views illustrating a method of forming a cell array having a partition structure using photoresist.
Figure 5B:
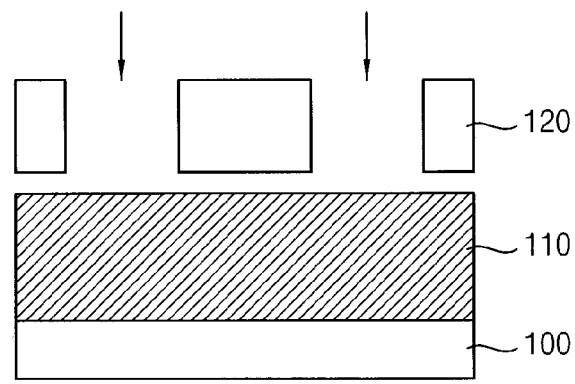
Figure 5C:
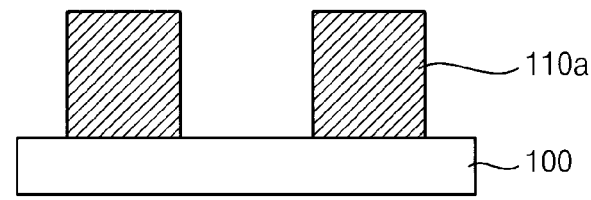

FIGS. 5A to 5C are cross-sectional views illustrating a method of forming a cell array of a partition structure using a photoresist.

Referring to FIG. 5A, a photoresist may be coated on a substrate 100 to form a photoresist layer 110. Referring to FIG. 5B, the photoresist layer 110 may be exposed by using a photo mask 120 including a pattern for forming the micro cells to change the exposed portion into an insoluble portion through cross-linking bonds. Referring to FIG. 5C, the exposed photoresist layer 110 may be developed to remove an unexposed soluble portion among the photoresist layer 110 while remaining the insoluble portion to form micro walls 110a. In this exemplary embodiment, the photolithography was applied to manufacture a partition structure cell array 200.

Sealing of Partition Structure Cell Array

Figure 6:
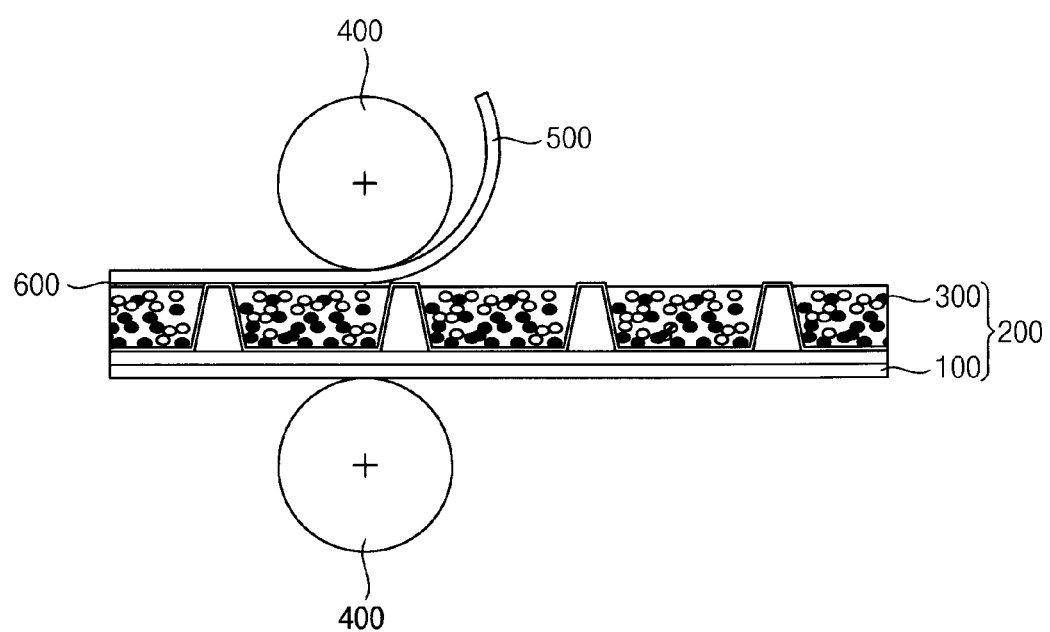
FIG. 6 is a cross-sectional view illustrating a sealing method using a thermosetting composition.

FIG. 6 is a cross-sectional view illustrating a sealing method using a thermosetting composition. Injection of an electrophoresis ink 300 into the partition structure cell array 200 may be performed by an inkjet method and after that, a sealing process may be performed.

A plurality of sealing methods may be applicable and a preferred method includes a method using the UV curable composition as described above, and a method using a thermosetting composition and an acryl type adhesive material.

The UV curable composition may float after being mixed with an ink injected in the partition structure cell array because of a difference in specific gravity with the electrophoresis ink. Accordingly, a UV exposure onto the UV curable composition may result in the sealing. The specific gravity of the UV curable composition may be preferably 2 or less.

Referring to FIG. 6, a urethane type curing agent may be used as a method using a thermosetting composition. Using a laminator 400, a curable layer 600 may be formed to a thickness of about 1 to 10 μm using a releasable paper film 500. Then, the partition structure cell array including injected ink may be sealed at a temperature of lower than 60° C. The urethane type thermosetting composition may include isocyanate, polyol and a solvent and may be prepared by using an amine to control molecular weight.

In exemplary embodiments, the urethane-based thermosetting composition (resin) may be prepared by using a one-liquid type thermosetting resin including a urea functional group in a urethane backbone. The urethane backbone may include polyisocyanate and may include methylene diisocyanate (MDI), TDI, IPTI, etc. When considering a yellowing property and reactivity, IPDI may be used in common. As the polyol, polycarbonate-based polyol having a molecular weight of about 1.000 to 2,000 may be used considering adhesiveness, a chemical-resistance, a heat-resistance, etc. In order to increase the molecular weight of the urethane backbone and considering the thermal properties, adhesiveness, a tensile strength, the strength of finally obtained product, etc., an amine may be used.

III. Evaluation on Physical Properties of Mixed Color Electronic Ink Having Good Electrophoresis and Bistability Manufacture of Cell for Driving To perform an experiment on evaluating a driving property of an electronic ink, white/black, white/red, white/green and white/blue mixed electronic inks were injected into rectangular partition structure cell arrays manufactured by Examples and Comparative Examples, by an inkjet dispensing method. Then, a sealing process was performed using a UV curable composition and then, an upper substrate including an electrode was combined.

Yield

The amount before the reaction to the amount after completing the reaction was converted into percentage.

Particle Size

The particle size was measured using Nano-ZS of Malvern Co.

Evaluation on Dispersibility

The ink was dispersed using the same dispersing agent and 0.5 mm nano mill for 2 hours and then was stored in a transparent reagent bottle. Then, cohesion and precipitation were evaluated.

Driving Voltage

The driving voltage was measured by using Picoammeter of Keithley Co.

Whiteness Index (Luminance)

The whiteness index of a driven white ink was measured using CS-200 of Konica Minolta Co. Luminance value (Lv) was measured to evaluate.

Color Reproducing Ratio

The chromaticity diagram coordinate value was measured by using CM-2600D apparatus of Konica Minolta Co. A percentage was evaluated based on national television system committee (NTSC).

Measuring Bistability

In order to evaluate the bistability of a driven white ink, a luminance value (Lv) was measured and evaluated by using CS-200 apparatus of Konical Minolta Co. The luminance value after 1 hour was converted into percentage (%) based on an initial luminance value.

Measuring Reflectance

The chromaticity diagram coordinate value was measured by using CM-2600D apparatus of Konica Minolta Co. A percentage (%) was evaluated based on national television system committee (NTSC).

Physical Properties of Color Core-Shell Particle

The physical properties of the color core-shell coated particles obtained by Examples and Comparative Example are illustrated in Table I.

TABLE 1

| | | \multicolumn{5}{c|}{Examples} | \multicolumn{5}{c|}{Comparative examples} |
|---|---|---|---|---|---|---|---|---|---|---|---|
| | | white | black | red | green | blue | white | black | red | green | blue |
| Yield (%) | | 88 | 75 | 85 | 82 | 80 | 50 | 42 | 40 | 60 | 40 |
| Mean particle size (nm) | Before coating | 250 | 130 | 250 | 200 | 220 | 250 | 130 | 250 | 200 | 220 |
| | After coating | 380 | 170 | 410 | 310 | 300 | 800 | 300 | 600 | 550 | 450 |
| Single color ink dispersibility | | ○ | ○ | ○ | ○ | ○ | Δ | Δ | Δ | Δ | Δ |

The single color ink dispersibility was evaluated with respect to single electronic inks. ○ represents good and Δ represents precipitation.

In the result on yield, the yields in Examples were 75% or more because the post-treating process was simple. However, the particle loss in Comparative Examples was high because the post-treating process was complicated.

When comparing the mean particle size before and after coating for the particles of Examples and Comparative Examples, it would be confirmed that the color particles of Examples were coated very thin.

When considering the dispersibility, it would be confirmed that no precipitation or agglomeration of the particles core-shell coated with hydrophobic organometallic compound in accordance with Examples was observed after storing for 1 day.

Physical Properties of Color Electronic Ink

The properties of the color electronic ink particles obtained in Examples and Comparative Examples are illustrated in Table 2. In Table 2, WB represents white/black, W/R represents white/red, W/G represents white/green and WB represents white/blue.

TABLE 2

| | | Examples (two color mixed ink) | | | | Comparative examples (two color mixed ink) | | | |
|---|---|---|---|---|---|---|---|---|---|
| | | W/B | W/R | W/G | W/B | W/B | W/R | W/G | W/B |
| Driving voltage (V) | White | 10 | 10 | 10 | 10 | 50 | 50 | 50 | 50 |
| | Color | 10 | 10 | 10 | 10 | 50 | 50 | 50 | 50 |
| Whiteness index Luminance value (Lv) | | 260 | 238 | 262 | 257 | 190 | 200 | 210 | 200 |
| Response time (msec) | White | 250 | 250 | 250 | 250 | 1,000 | 1,000 | 1,000 | 1,000 |
| | Color | 250 | 250 | 250 | 250 | 1,000 | 1,000 | 1,000 | 1,000 |
| Reflectance (%) | White | 48 | 43 | 52 | 45 | 45 | 44 | 45 | 40 |
| | Color | 6 | 13 | 14 | 17 | 8 | 25 | 18 | 15 |
| Color reproducing rate (%) | | 14% | | | | 8% | | | |
| Bistability (%) (Color maintaining ratio) | | 90% | | | | 50% | | | |

Charge of Color Electronic Ink

The charge properties of the color electronic inks are illustrated in following Table 3.

TABLE 3

| | White/black | White/red | White/green | White/blue |
|---|---|---|---|---|
| White particle charge | + | + | + | + |
| Color particle charge | − | − | − | − |

From the results, the driving voltage of the mixed ink in accordance with Examples was 10 V and that of the Comparative Examples was 50 V. Since the mixed color electronic inks using the color pigment particles coated with ionized organometallic compound in accordance with Examples exhibit a high surface charge, the driving voltage of the mixed ink in accordance with Examples was low. Particularly, the pigment particles coated with cationic organometallic compound may have a positive charge and the pigment particles coated with anionic organometallic compound may have a negative charge.

The response time was 250 msec for Examples and 1,000 msec for Comparative Examples. A rapid response time at a low voltage may be achieved for the ionized particles in accordance with Examples.

Since the thickness of the core-shell coated layer is small and the mobility is high, and the surface portion of the particles are ionized to increase the quantity of electric charge, the properties concerning the driving voltage and the response time may be better for the Examples when compared to Comparative Examples.

The results on reflectance are similar and the separation of color while driving may be clear for both of the mixed color inks in accordance with Examples and Comparative Examples The bistability for Examples was about 90% and the phase change of the particles may be scarce after ceasing power supply.

In accordance with the present inventive concept, a reflective type display device may display an image utilizing an external light different from an LCD device or a PDP device utilizing a back light. The reflective type display device may be flexible and have a very thin thickness because the reflective type display device does not include the light source such as the back light within the device.

The foregoing is illustrative of example embodiments and is not to be construed as limiting thereof. Although a few example embodiments have been described, those ordinary skilled in the art will readily appreciate that many modifications are possible in the example embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An ink composition comprising:
   ink particles core-shell coated with at least one ionized hydrophilic organometallic compound and at least one hydrophobic organometallic compound;
   a dispersing agent; and
   a dielectric liquid.

2. The ink composition of claim 1, wherein the ink composition includes about 30 to 70 percent by weight of the ink particles, about 10 to 20 percent by weight of the dispersing agent and about 10 to 50 percent by weight of the dielectric liquid.

3. The ink composition of claim 1, wherein the ink particles include at least one electronic ink particles selected from the group consisting of white ink particles, black ink particles, red-colored ink particles, green-colored ink particles and blue-colored ink particles.

4. The ink composition of claim 1, wherein the organometallic compound includes at least one metal atom or metalloid atom.

5. A method of preparing an ink composition, comprising:
   preparing core-shell coated pigment particles by core-shell coating using pigment particles, at least one hydrophilic organometallic compound, at least one hydrophobic organometallic compound, distilled water and a solvent;

preparing ink particles coated with an ionized organometallic compound by using the core-shell coated pigment particles, the solvent and a halogen compound; and mixing the ink particles, a dispersing agent and a dielectric liquid.

6. The method of claim 5, wherein about 30 to 70 percent by weight of the pigment particles, about 10 to 30 percent by weight of the hydrophilic organometallic compound, about 5 to 20 percent by weight of the hydrophobic organometallic compound, about 10 to 40 percent by weight of the distilled water and about 30 to 50 percent by weight of the solvent are used.

7. The method of claim 5, wherein the ink particles coated with the ionized organometallic compound are prepared by using about 30 to 50 percent by weight of the core-shell coated pigment particles, about 20 to 50 percent by weight of the solvent and about 10 to 30 percent by weight of the halogen compound.

8. The method of claim 5, wherein about 30 to 70 percent by weight of the ink particles, about 10 to 20 percent by weight of the dispersing agent and about 10 to 50 percent by weight of the dielectric liquid are used in the mixing step.

9. The method of claim 5, wherein the core-shell coated pigment particles are prepared by using a sol-gel process at a surface portion of the pigment particles.

10. The method of claim 5, wherein the ink particles include at least one electronic ink particles selected from the group consisting of white ink particles, black ink particles, red-colored ink particles, green-colored ink particles and blue-colored ink particles.

11. The method of claim 5, wherein the hydrophilic organometallic compound includes at least one compound for imparting a positive charge, selected from the group consisting of aminopropyl trimethoxy silane, aminopropyl triethoxysilane, aminopropylmethyl diethoxysilane, m-aminophenyl trimethoxysilane, n-methyl aminopropylmethyl dimethoxysilane, phenyl aminopropyl trimethoxysilane, aminoethyl aminopropyl trimethoxysilane, aminoethyl aminopropylmethyl dimethoxysilane, aminoethyl aminoisobutylmethyl dimethoxysilane, benzylethyl diaminopropyl trimethoxysilane and benzylethyl diaminopropyl triethoxysilane, or at least one compound for imparting a negative charge, selected from the group consisting of sodium trihydroxysilylpropylmethyl phosphonate, sodium methyl siliconate, potassium methyl siliconate, lithium methyl siliconate, sodium silicate, potassium silicate and titanium phosphate.

12. The method of claim 5, wherein the hydrophobic organometallic compound includes at least one selected from the group consisting of methyl trimethoxysilane, dimethyl trimethoxysilane, tetraorthosilicate and hydroxyl terminated polydimethylsiloxane.

13. The method of claim 12, wherein a weight mean molecular weight of the hydroxyl terminated polydimethylsiloxane is in a range of about 500 to 5,000.

14. The method of claim 5, wherein the halogen compound includes at least one selected from the group consisting of methyl chloride, ethyl chloride, butyl chloride, pentyl chloride, hexyl chloride, heptyl chloride, octenyl chloride, noneyl chloride, decanyl chloride, benzyl chloride, methyl sulfonate, ethyl sulfonate, butyl sulfonate and pentyl sulfonate.

15. A mixed color ink composition comprising:

a first ink composition including first ink particles core-shell coated with at least one ionized hydrophilic organometallic compound and at least one hydrophobic organometallic compound, a dispersing agent and a dielectric liquid;

a second ink composition including second ink particles core-shell coated with at least one ionized hydrophilic organometallic compound and at least one hydrophobic organometallic compound, the dispersing agent and the dielectric liquid; and a low dielectric liquid.

16. The mixed color ink composition of claim 15, wherein the mixed color ink composition includes about 10 to 50 percent by weight of the first ink composition, about 10 to 50 percent by weight of the second ink composition and about 30 to 80 percent by weight of the low dielectric liquid.

17. A display panel comprising:

a substrate including a cell structure defined by partitioned walls; and an ink composition sealed in the cell structure, the ink composition including ink particles core-shell coated with at least one ionized hydrophilic organometallic compound and at least one hydrophobic organometallic compound, a dispersing agent and a dielectric liquid.

18. A display panel comprising:

a substrate including a cell structure defined by partitioned walls; and a mixed color ink composition sealed in the cell structure, the mixed color ink composition including a first single color ink composition obtained by dispersing uniformly ink particles core-shell coated with at least one ionized hydrophilic organometallic compound and at least one hydrophobic organometallic compound in a dielectric liquid, and a second single color ink composition having different color from the first single color ink composition.

19. A method of manufacturing a display panel, comprising:

preparing a first single color ink composition by dispersing uniformly ink particles core-shell coated with at least one ionized hydrophilic organometallic compound and at least one hydrophobic organometallic compound in a dielectric liquid;

preparing a second single color ink composition having a different color from the first single color ink composition;

preparing a mixed color ink composition by mixing the first and second single color ink compositions; and forming a pixel by injecting the mixed color ink composition into a cell structure.

* * * * *

UNITED STATES PATENT AND TRADEMARK OFFICE
CERTIFICATE OF CORRECTION

PATENT NO.         : 8,786,936 B2                                              Page 1 of 1
APPLICATION NO.    : 13/623369
DATED              : July 22, 2014
INVENTOR(S)        : Kong et al.

It is certified that error appears in the above-identified patent and that said Letters Patent is hereby corrected as shown below:

On the title page item [75] name of First Inventor should read "Jung-Il Kong"

Signed and Sealed this
Third Day of February, 2015

Michelle K. Lee
*Deputy Director of the United States Patent and Trademark Office*